United States Patent
Breeze et al.

(10) Patent No.: US 10,734,778 B2
(45) Date of Patent: Aug. 4, 2020

(54) APPARATUS AND METHOD FOR ESTABLISHING QUANTUM OSCILLATIONS

(71) Applicants: Imperial Innovations Limited, London (GB); UCL BUSINESS PLC, London (GB)

(72) Inventors: Jonathan David Baxendale Breeze, London (GB); Enrico Salvadori, London (GB); Chris Kay, London (GB)

(73) Assignees: IMPERIAL COLLEGE OF SCIENCE, TECHNOLOGY AND MEDICINE, London (GB); UCL BUSINESS LTD, London (GB)

( * ) Notice: Subject to any disclaimer, the term of this patent is extended or adjusted under 35 U.S.C. 154(b) by 0 days.

(21) Appl. No.: 16/333,254

(22) PCT Filed: Sep. 14, 2017

(86) PCT No.: PCT/GB2017/052716
§ 371 (c)(1),
(2) Date: Mar. 14, 2019

(87) PCT Pub. No.: WO2018/051099
PCT Pub. Date: Mar. 22, 2018

(65) Prior Publication Data
US 2019/0252842 A1      Aug. 15, 2019

(30) Foreign Application Priority Data
Sep. 14, 2016  (GB) .................................. 1615645.7

(51) Int. Cl.
| *H01S 1/02* | (2006.01) |
| *B82Y 10/00* | (2011.01) |
| *G06N 10/00* | (2019.01) |

(52) U.S. Cl.
CPC ................ *H01S 1/02* (2013.01); *B82Y 10/00* (2013.01); *G06N 10/00* (2019.01)

(58) Field of Classification Search
CPC .. H01S 1/00; H01S 1/02; B82Y 10/00; B82Y 20/00; G06N 10/00
See application file for complete search history.

(56) References Cited

U.S. PATENT DOCUMENTS

| 9,293,890 B2 * | 3/2016 | Breeze ................. G01R 33/343 |
| 2015/0043056 A1 | 2/2015 | Capua |
| 2017/0077665 A1 * | 3/2017 | Liu ........................... H01S 1/02 |

FOREIGN PATENT DOCUMENTS

| WO | 2013175235 | 11/2013 |
| WO | 2014027205 | 2/2014 |

OTHER PUBLICATIONS

Vignesh, R., and P. G. Poonacha. "Quantum computer architectures: An idea whose time is not far away." 2015 International Conference on Computers, Communications, and Systems (ICCCS). IEEE, 2015. (Year: 2015).*

(Continued)

*Primary Examiner* — Ryan Johnson
(74) *Attorney, Agent, or Firm* — Kirschstein, Israel, Schiffmiller & Pieroni, P.C.

(57) ABSTRACT

Apparatus and method establish quantum oscillations at room temperature. A cavity has therein a resonator structure that includes a resonant element and a gain medium. A species of the gain medium has an electronic spin multiplicity capable of supporting a two-level spin system. An optical pump pumps the resonator structure and thereby generates microwave output power through stimulated emission of thermal photons. The species of the gain medium is of a sufficiently high concentration such as to have an ensemble spin-photon coupling rate which exceeds both the cavity mode decay rate and the spin-spin decoherence rate.

(Continued)

The optical pump pumps the resonator structure using a short pulse of nanosecond duration, or a burst of approximately a millisecond in duration at relatively low instantaneous optical power, to excite said species of the gain medium into a spin-polarized two-level system that exhibits quantum oscillations in the microwave output power.

20 Claims, 3 Drawing Sheets

(56) References Cited

OTHER PUBLICATIONS

United Kingdom Search Report in corresponding UK appl. No. GB1615645.7, dated Jan. 26, 2017.
International Search Report in corresponding international appl. No. PCT/GB2017/052716, dated Dec. 5, 2017.
Written Opinion in corresponding international appl. No. PCT/GB2017/052716, dated Dec. 15, 2017.
Oxborrow, et al., "Room-temperature solid-state maser", Nature, vol. 488, pp. 353-356, Aug. 16, 2012.
Breeze, et al., "Enhanced magnetic Purcell effect in room-temperature masers", Nature Communications, vol. 6:6215, DOI: 10.1038/ncomms7215, pp. 1-6, 2015.
Reithmaier, et al., "Strong coupling in a single quantum dot—semiconductor microcavity system", Nature, vol. 432.7014, pp. 197-200, 2004.
Kurizki, et al., "Quantum technologies with hybrid systems", Proceedings of the National Academy of Sciences, vol. 112.13: pp. 3866-3873, 2015.
Yago, et al., "Quantum oscillations in photo-excited triplet states in an external magnetic field", Chemical Physics Letters, vol. 438, pp. 351-357, 2007.
Fuchs, et al., "Excited-state spin coherence of a single nitrogen-vacancy centre in diamond", Nature Physics, vol. 6, pp. 668-672, Sep. 2010.
YouTube video, "Room-temperature solid-state maser", YouTube. com, https://www.youtube.com/watch?v=yB9751-PEbM [accessed Jan. 26, 2017].

* cited by examiner

Magnetic field magnitude | Electric field magnitude

APPARATUS AND METHOD FOR ESTABLISHING QUANTUM OSCILLATIONS

FIELD OF THE INVENTION

The present invention relates to an apparatus and method for establishing quantum oscillations between spin-ensembles and a cavity, with the ability to achieve such quantum oscillations at room temperature.

BACKGROUND TO THE INVENTION

The resonant coupling of atoms or spins (electronic or nuclear) to cavity modes has been a mainstay area of research in the field of quantum optics for many decades, and has recently attracted renewed interest in the field of quantum information processing and quantum computing where the spins serve as a quantum memory (qubits). However, the individual coupling of magnetic spins to the electromagnetic field of a cavity mode is too weak to allow for efficient coherent transfer of excitation (information) to and from the spins on a timescale shorter than the spin decoherence and cavity decay times. This requires the spin-cavity system to be in the "strong coupling" regime, where the coupling rate exceeds both the spin decoherence and cavity decay rates.

The spin-photon coupling rate of a single electronic spin is given by $g_s = \gamma\sqrt{\mu_0 \hbar \omega_c/2V_m}$, where $\gamma$ is the electron gyromagnetic ratio, $\mu_0$ is the vacuum magnetic permeability, $\omega_c/2\pi$ is the resonant frequency and $V_m$ is the magnetic mode volume of the cavity mode. The single spin-photon coupling is in the millihertz range for cavity frequencies in the 1-10 GHz range. It can be increased by reducing the mode volume (physical size of the resonator), but practically it is difficult to achieve a spin-photon coupling rate greater than 1 Hz. This upper limit is anyway impractical for spin-cavity excitation transference considering that spin coherence times are usually of the order of 10-1000 μs even at low temperatures. If a large number of spins N are placed within the cavity mode and close enough together so that they experience the same coupling, then through their individual interaction with the cavity mode they behave collectively as a so-called "spin-ensemble" with a spin-photon coupling enhanced by a factor $\sqrt{N}$. For a collection of $10^{14}$ spins, the ensemble spin-photon coupling rate is enhanced by 7 orders of magnitude to the MHz range. This means that the coherent transfer of excitations between the spin-ensemble and the cavity mode occurs on the 1 μs timescale, which if less than the spin-decoherence and cavity-decay times ensures that the strong-coupling regime has been reached. This coherent exchange of energy back and forth between a spin-ensemble and the cavity mode produces quantum oscillations known as Rabi oscillations, which are the hallmark of a system in the "strong coupling" regime which permits spin-operations to be performed on a "qubit".

These phenomena are usually observed at cryogenic temperatures with spin-ensembles consisting of a few million spins (in the milli-Kelvin range). Cryogenic temperatures are required for a number of reasons: in order to reduce the influence of thermal photons, to mitigate decoherence effects, and also to provide thermal polarization of the two-level spin system.

In more detail, existing methods of establishing coherent quantum oscillations between spin-ensembles and cavities rely on refrigeration to cryogenic temperatures in order to satisfy a number of criteria:

(i) Currently, diamond-NV centres are a popular means of providing a population of triplet states that can behave as an ensemble of spins. Spin polarization may be achieved due the preferential population of the lower states at low temperatures according to the Boltzmann distribution. Polarization through optical pumping and spin-selective intersystem crossing is also possible. NV-diamond samples usually have NV concentrations of 1 ppm and 10 ppm at most.

(ii) In order to increase the spin-photon coupling, small mode volume resonators are realised using superconducting niobium stripline resonators. These require cooling below a few Kelvin in temperature and only provide quality factors of a few thousand.

(iii) The low concentration of NV centres and the small sample volumes limit the available number of spins to be in the region of $10^6$-$10^7$. [1]

Some researchers have reported using transition metal oxides (such as YAG) to provide a greater concentration of spins [2]. However, this approach still relies on cryogenic temperatures in order to preferentially populate and thus polarize the spin sub-levels.

It will be appreciated that the use of cryogenic temperatures significantly increases the complexity, usability and cost of practical systems for establishing coherent quantum oscillations, in turn hindering the development of quantum information processing systems. There is therefore a desire to achieve quantum oscillations at room temperature (i.e. around 293 K).

Further background art is provided in WO 2013/175235 A1, which discloses a device and method for generating stimulated emission of microwave or radio frequency radiation, e.g. to produce masing. Additional background art in respect of masing is provided in WO 2014/027205 A2.

SUMMARY OF THE INVENTION

According to a first aspect of the present invention there is provided apparatus as defined in Claim 1 of the appended claims, for establishing quantum oscillations (in particular, Rabi oscillations) at room temperature. Thus there is provided apparatus comprising: a cavity having a resonator structure therein, the resonator structure comprising a resonant element and a gain medium, a species of the gain medium having an electronic spin multiplicity capable of supporting a two-level spin system; and optical pumping means arranged to pump the resonator structure and thereby generate microwave output power through stimulated emission of microwave photons; wherein said species of the gain medium is of a sufficiently high concentration such as to have an ensemble spin-photon coupling rate which exceeds both the cavity mode decay rate and the spin-spin decoherence rate; and wherein the optical pumping means is configured to pump the resonator structure using a short pulse of nanosecond duration, or a burst of approximately a millisecond in duration at relatively low instantaneous optical power, to excite said species of the gain medium into a spin-polarized two-level system that exhibits quantum oscillations in the microwave output power.

By having a sufficiently high concentration of said species of the gain medium, and optical pumping the resonator structure using one or more short pulses of nanosecond duration, or a burst of approximately a millisecond in duration at relatively low instantaneous optical power, this enables the coherence of the spin-ensemble to be preserved, thereby enabling quantum oscillations to be exhibited at room temperature.

More particularly, in certain embodiments, only a single nanosecond pulse is required to generate an inverted population of triplet states, which then becomes coupled to the cavity mode. Alternatively, a more sustained millisecond burst, of lower instantaneous optical power, may be used. Once inverted populations have been generated, it is not strictly necessary to apply more optical pumping (as we have seen from our experiments). However, once the phenomenon has decayed and all electrons returned to the ground state, the process may be repeated.

Optional features are defined in the dependent claims.

Thus, in certain embodiments the optical pumping means may comprise a pulsed laser.

The optical pumping means may be configured to provide short pulses of approximately 4 ns in duration. Further, the optical pumping means may be configured to provide pulses with an energy of the order of 10 mJ.

In other embodiments the optical pumping means may comprise a laser diode, a light emitting diode, or a flash lamp.

The gain medium may contain matter with a long-lived triplet state, such as a polyaromatic hydrocarbon. In presently-preferred embodiments the gain medium comprises p-terphenyl doped with pentacene, such that said species comprises pentacene molecules. In such a case, the optical pumping means is preferably configured to pump the resonator structure with light at a wavelength of approximately 600 nm.

The concentration of said species of the gain medium is preferably of the order of 0.1% or greater, for example at least 0.5%. Particularly preferably the concentration of said species is of the order of 1% or greater.

In alternative embodiments other materials may be used for the gain medium. For example, the gain medium may comprise diamond with nitrogen vacancy (NV) centres, such that said species comprises nitrogen vacancy centres. In such a case, the optical pumping means is preferably configured to pump the resonator structure with light at a wavelength of approximately 532 nm.

Alternatively, the gain medium may comprise silicon carbide with vacancy defects, such that said species comprises vacancy defects. In such a case, the optical pumping means is preferably configured to pump the resonator structure with light at a wavelength of approximately 800 nm (e.g. approximately 808 nm).

In the case of nitrogen vacancy centres in diamond, or vacancy defects in silicon carbide, the concentration of the vacancy centres or vacancy defects may be in the range of 0.1 parts per million to 10 parts per million or greater.

Preferably the gain medium is a single crystal.

In presently-preferred embodiments the resonant element comprises strontium titanate ($SrTiO_3$). However, in alternative embodiments other materials may be used, such as titanium dioxide ($TiO_2$), potassium tantalate ($KTaO_3$), or alumina ($Al_2O_3$).

Preferably the resonant element has a quality factor of the order of 10,000 or greater.

Preferably the magnetic mode volume of the resonant element is sufficiently small so as to enhance the ensemble spin-photon coupling rate. For example, in respect of a resonant frequency f of 1.45 GHz, the resonant element may have a magnetic mode volume of approximately 50 $cm^3$ or less. In some cases, at this resonant frequency, the resonant element may have a magnetic mode volume of the order of 1 $cm^3$ or less. For example, the resonant element may advantageously have a magnetic mode volume of approximately 0.2 $cm^3$ or less. As the magnetic mode volume scales with $1/f^3$, at other resonant frequencies the magnetic mode volume will be different. For example, at a resonant frequency of say 14.5 GHz, the magnetic mode volume would be one thousand times smaller than at a resonant frequency of 1.45 GHz, all other things being equal.

In presently-preferred embodiments said species of the gain medium has a spin-photon coupling rate of the order of 1 MHz or above.

It is envisaged that the apparatus may further comprise a source of input radiation (e.g. microwave signals) for manipulating the spin system of the gain medium.

In presently-preferred embodiments the gain medium is disposed within the resonant element.

In alternative embodiments various techniques may be used to increase the spin-photon coupling rate of the resonator structure. For example, the resonant element may comprise an electrically inductive metallic loop structure having one or more half-turns, and an electrically capacitive structure.

With our presently-preferred embodiments, the exhibited quantum oscillations have a Rabi oscillation frequency of the order of 1-2 MHz (i.e. a period of about 0.5 μs to 1 μs) and are at least 10 in number.

According to a second aspect of the present invention there is provided a method of establishing quantum oscillations (in particular, Rabi oscillations) at room temperature, the method comprising: providing a cavity having a resonator structure therein, the resonator structure comprising a resonant element and a gain medium, a species of the gain medium having an electronic spin multiplicity capable of supporting a two-level spin system; and optical pumping the resonator structure and thereby generating microwave output power through stimulated emission of microwave photons; wherein said species of the gain medium is of a sufficiently high concentration such as to have an ensemble spin-photon coupling rate which exceeds both the cavity mode decay rate and the spin-spin decoherence rate; and wherein the optical pumping pumps the resonator structure using a short pulse of nanosecond duration, or a burst of approximately a millisecond in duration at relatively low instantaneous optical power, to excite said species of the gain medium into a spin-polarized two-level system that exhibits quantum oscillations in the microwave output power.

Optional features in respect of the method are as set out above in relation to the apparatus.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF PREFERRED EMBODIMENTS

The present embodiments represent the best ways known to the applicants of putting the invention into practice. However, they are not the only ways in which this can be achieved.

The present embodiments manage to remove the above-mentioned conventional requirement of cryogenic temperatures by using a short (e.g. nanosecond) laser pulse in order to produce an almost instantaneous spin-polarized (inverted) population of electrons in triplet states. This, together with a cavity resonator having a small mode volume and a high quality factor, and a high concentration of triplet species, enables quantum oscillations in the strong-coupling regime to be achieved at room temperature. This is evidenced by the observation of coherent quantum oscillations between the spin-ensemble and the cavity mode, manifest as oscillations in the power of the output microwave radiation. Indeed, quantum oscillations in the microwave output power are a characteristic signature of the strong-coupling regime. The high microwave photon and spin populations reduce the effect of thermal photon noise.

It should be noted that quantum oscillations are not seen under continuous (or quasi-continuous) optical pumping. If optical pumping is continuous (or quasi-continuous) then it destroys the quantum coherence and no quantum oscillations occur.

The way in which the coherent quantum oscillations may be achieved at room temperature is described in detail below. Firstly, though, we will describe the resonator apparatus used in the present work.

Overview of Resonator Apparatus

Figure 1:
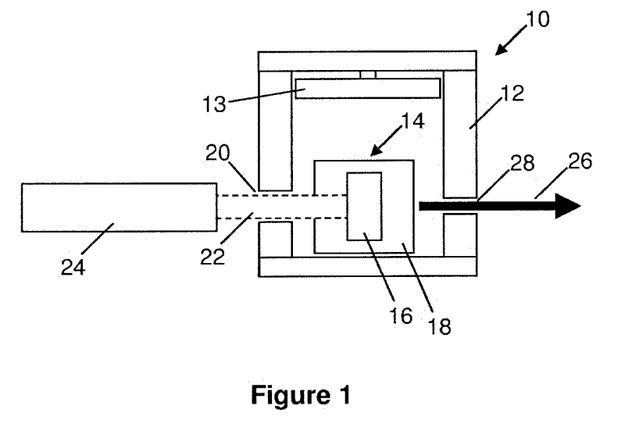
FIG. 1 illustrates a schematic diagram of a cavity resonator (not to scale), as may be used to establish spin-photon coupling at room temperature.

FIG. 1 schematically illustrates a resonator apparatus 10, similar to those discussed in WO 2013/175235 A1, as used in the present work. However, unlike embodiments described in WO 2013/175235 A1, in the present work the resonator apparatus 10 does not operate as a maser (i.e. does not amplify input microwave radiation).

An outer casing 12 (e.g. made of copper) defines a cavity therein. Within the cavity (i.e. within the outer casing 12) is a resonator structure 14 that includes a gain medium 16 disposed within a resonant element 18. The resonant element 18 may be mounted on a suitable substrate (not illustrated), so as to support it above the base of the outer casing 12.

The outer casing 12 has an inlet 20 through which the resonator structure 14 can receive a beam of light 22 provided by a light source 24 acting as optical pumping means. The beam of light 22 is preferably in the visible spectrum; the exact wavelength used depends on the gain medium 16.

The beam of light 22 acts as an input of energy to pump the resonator structure 14, in particular the gain medium 16, to cause stimulated emission of microwave photons, producing output microwave radiation which is coupled (magnetically or electrically) to a transmission line 26 via an outlet (iris) 28 or coupling device in the outer casing 12.

It is also envisaged that microwave signals may be applied to the resonator structure 14 in order to manipulate the spin system of the gain medium 16.

In the present embodiments the light source 24 may be a laser, a laser diode, a light emitting diode, or a flash lamp. Typical wavelengths of the beam of light 22 from the light source 24 are approximately 600 nm (e.g. for pumping pentacene), or approximately 532 nm (e.g. for pumping diamond with nitrogen vacancies), or approximately 808 nm (e.g. for pumping silicon carbide with silicon vacancy defects).

In our presently-preferred embodiments the resonant element 18 surrounds the gain medium 16. For example, the gain medium 16 may be cylindrical in shape, with the resonant element 18 being ring-shaped or toroidal and coaxially surrounding the cylindrical gain medium 16 (i.e. the gain medium 16 being slotted inside the resonant element 18).

Preferably the gain medium 16 contains matter with a long-lived triplet state, and the resonant element has a high relative permittivity and a low dielectric loss.

As discussed in detail below, in our presently-preferred embodiments the gain medium 16 comprises a single crystal of p-terphenyl doped with pentacene ($C_{22}H_{14}$), and the resonant element 18 comprises strontium titanate ($SrTiO_3$, or "STO"), but other materials may alternatively be used, as discussed below. The material of the resonant element 18 is preferably single crystal, but in alternative embodiments may be polycrystalline.

Preferably the gain medium 16 is oriented such that the molecular y-axis of the pentacene is aligned with a magnetic field component of the microwave magnetic field, such that the microwave magnetic field in the $TE_{01\delta}$ mode behaves like a magnetic dipole and induces X-Z transitions in the pentacene triplet-state sublevels (as illustrated in FIG. 2(b) of [3]).

As illustrated in FIG. 1, in the presently-preferred embodiment the outer casing 12 is provided with an adjustable top wall 13 (which, though advantageous, is by no means essential). The adjustable top wall 13 enables the resonant frequency of the overall resonator structure to be tuned, by moving the adjustable wall 13 towards or away from the gain medium 16 and the resonant element 18. Alternatively, or in addition, a tuning screw may be provided—that is, a screw or post with a variable extent of penetration into the electromagnetic field of the resonator structure, the extent of penetration being adjustable in order to tune the resonant frequency.

The Attainment of Spin-Photon Coupling at Room Temperature

Surprisingly (through a series of experimental events, as described in the Appendix below), we have found that it is possible to achieve strong spin-photon coupling at room temperature using optically excited pentacene molecules within a highly miniaturised cavity resonator constructed from high-permittivity strontium titanate (STO) dielectric material. That is, with reference again to FIG. 1, in this case the gain medium 16 comprises a crystal of p-terphenyl doped with pentacene ($C_{22}H_{14}$) and the resonant element 18 comprises STO. Upon photo-excitation of the pentacene molecules by a nanosecond laser as the light source 24, we have observed coherent quantum oscillations between the spin-ensemble and the cavity mode confirming that the strong coupling regime has been attained. This device may form the basis for a quantum bit (qubit) used for quantum information processing and quantum computing.

Figure 2:
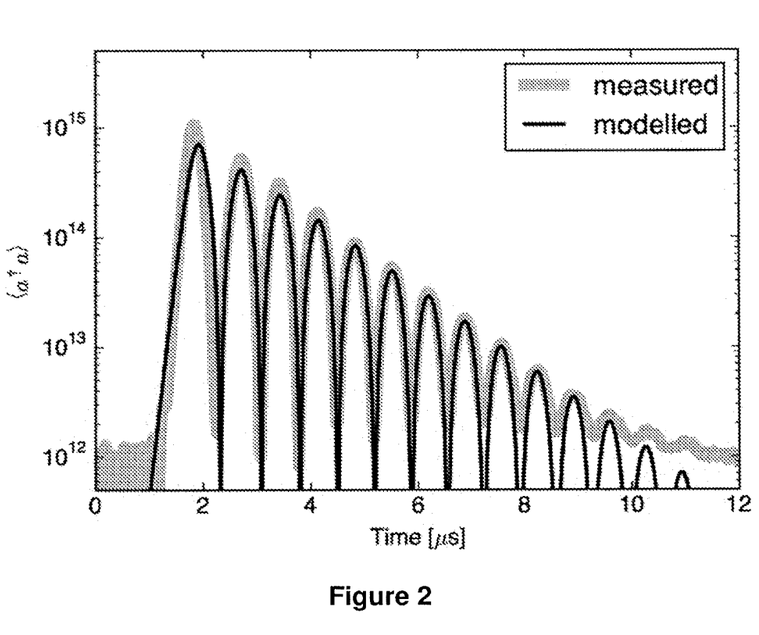
FIG. 2 is a plot of the cavity mode photon number $\langle a^\dagger a \rangle$ against time, derived from experimental measurements, in respect of a cavity resonator, showing room-temperature coherent Rabi oscillations due to strong coupling between spin-ensemble and microwave mode.

FIG. 2 is a plot, generated from our experimental results, showing the microwave output from the pentacene/STO device, and displaying clear quantum oscillations as energy is transferred coherently between the spin-ensemble and the cavity mode. The vertical axis, the cavity mode photon population $\langle a^\dagger a \rangle$, is a function of the experimentally-measured output power of the microwave radiation. Over 10 quantum (Rabi) oscillations are observed during the lifetime of the phenomenon, which is governed primarily by the quality-factor of the STO resonator and secondly by the spin-spin decoherence rate of the photo-excited pentacene molecules.

In more detail, the present work builds upon two existing patent disclosures relating to masers, WO 2013/175235 A1 and WO 2014/027205 A2. The key developments in the present work are the attainment, at room temperature, of strong-coupling supported by the observation of quantum (Rabi) oscillations, and the manner of generating a correlated collective spin-ensemble in a triplet supporting chromophore (e.g. pentacene doped p-terphenyl) using, for example, short nanosecond laser pulses.

The present work follows a recent demonstration of a room-temperature solid-state maser by optically pumping a pentacene-doped p-terphenyl organic crystal housed within a sapphire dielectric resonator [4]. This type of maser was subsequently improved and miniaturised by using high electrical permittivity strontium titanate as the dielectric resonator material [3]. Miniaturisation lowered the optical pump threshold by two orders of magnitude, yet the pump rate per molecule remained essentially the same. Both masers were only demonstrated in pulsed mode, where the maser bursts lasted 10-100 µs. Quantum (Rabi) oscillations and therefore strong-coupling were not observed in these masers for the following reasons: (i) in the case of the sapphire-based maser, the mode volume was too large, (ii) the concentration of pentacene molecules was too low, and (iii) the optical excitation was provided by a long optical pulse (which destroys the coherence of the spin-ensemble).

With regard to our presently-preferred embodiments, the developments that have enabled strong-coupling quantum oscillations to be achieved and observed at room temperature include (i) the realisation that the spin-photon coupling can be achieved by increasing the concentration of the molecules of the gain medium (e.g., in this case, pentacene) to a sufficiently high level, such that the spin-photon coupling rate exceeds both the cavity mode decay rate (reciprocal of quality factor) and the spin-spin decoherence rate; and (ii) the use of a short nanosecond duration pulsed laser (or other optical pumping means) with sufficient optical energy to near simultaneously excite the molecules of the gain medium into triplet states, thus forming a spin-polarized two-level system (spin-ensemble) at room temperature.

Preferably a short nanosecond duration pulsed laser (or other optical pumping means, such as a laser diode, a light emitting diode, or a flash lamp) is used to excite the molecules of the gain medium, by providing discrete short pulses of nanosecond duration.

However, instead of using short nanosecond duration optical pulses, the triplet system may be spin-polarized by using optical pumping means (e.g. a laser, laser diode, light emitting diode, or flash lamp) arranged to provide more sustained optical pumping, at relatively low instantaneous optical power, in the form of a burst of approximately a millisecond in duration. As those skilled in the art will appreciate, such a burst is fundamentally different from continuous optical pumping, which would destroy the oscillation effect. However, by applying sustained optical pumping, at relatively low instantaneous optical power, in the form of a short burst (e.g. for approximately 1 millisecond), decoupled from the cavity, this is sufficient to energise the spins such that they subsequently exhibit quantum oscillations. For example, to sufficiently polarize $10^{15}$ spins in pentacene would require a burst of 50 Watts of optical power for a duration of 500 µs.

It will be appreciated that the quantum oscillations shown in FIG. 2 exhibit a "ring-down" effect, i.e. the amplitude of the oscillations decreases with time. This effect will now be discussed in more detail with reference to FIG. 3, which illustrates the decay rate of the spin-photon oscillation envelope versus cavity. The upper dashed line (labelled "spin-photon decay" in the plot) shows the decay of the spin-photon oscillation envelope, and the lower dashed line (labelled "photon decay Q=6000" in the plot) shows the decay of the cavity mode. We remark in passing that the plot of FIG. 3 is generated from a different experiment to that of FIG. 2.

The energy coherently transfers between the cavity mode and the spin-ensemble with a Rabi frequency of ~1-2 MHz, which governs the period of oscillation. The decay rate of the phenomenon seems to be slower than the decay rate expected from the cavity mode. This is due to the fact that the energy spends half its time within the cavity and the other in the spin-ensemble. The spin-ensemble has a much lower decay rate than the cavity, therefore the overall decay rate is an average.

Figure 3:
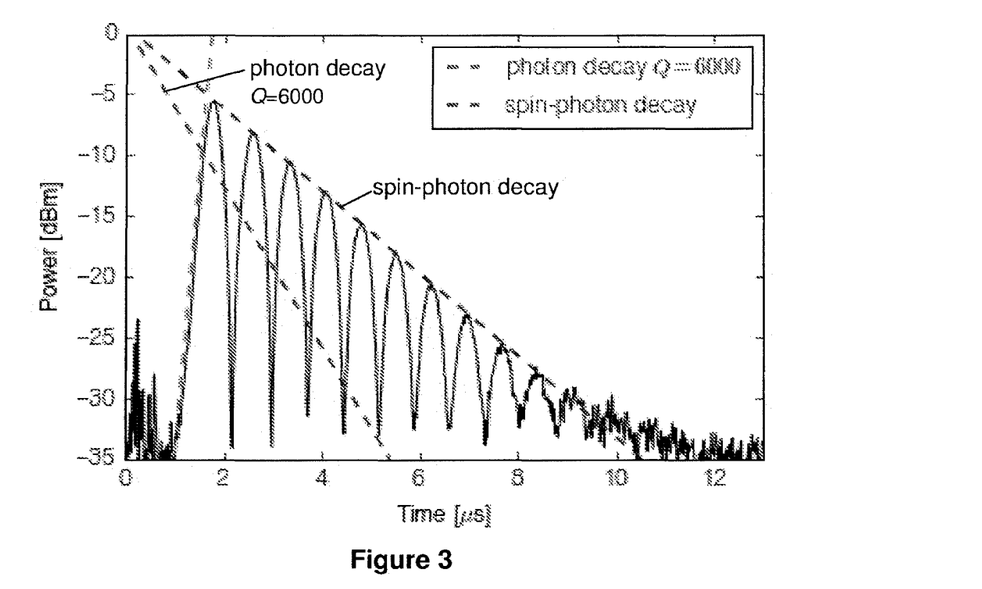
FIG. 3 is a plot of experimentally-measured output power against time, in respect of a cavity resonator, showing room-temperature coherent Rabi oscillations and illustrating the decay rate of the spin-photon oscillation envelope versus cavity.

FIG. 3 shows that the envelope of the power oscillations decays at half the rate of the cavity on its own. The oscillations persist for 10 µs whereas the cavity ring-down would have only persisted for 5 µs.

For a cavity quality factor Q~6,000, the decay rate in respect of the cavity, $\kappa_C$, is ~$1.5 \times 10^6$ s$^{-1}$. The spin-ensemble decay rate, $\kappa_S$, is estimated to be much lower at ~$0.1 \times 10^6$ s$^{-1}$.

As those skilled in the art will appreciate, the strong coupling regime is reached when the energy exchange rate between the spin-ensemble and cavity mode exceeds both the decay rates of the spin-ensemble and the cavity mode.

The strong-coupling criterion is usually expressed as $g_e \gg \kappa_C, \kappa_S$, where $g_e$ is the ensemble spin-photon coupling rate, $\kappa_C$ is the cavity decay rate and $\kappa_S$ is the spin-ensemble decay rate (decoherence rate). This is necessary since we require that there are some spin-photon oscillations before the cavity or ensemble spin modes decay.

There is arguably a better criterion for achieving strong coupling, namely the "cooperativity number", defined as $$C = \frac{g_e^2}{\kappa_C \kappa_S}.$$

If this number is greater than unity (i.e. C>1), then the strong coupling regime has been reached. The cooperativity gives a rough idea of how many Rabi oscillations occur before the coupled spin-ensemble and cavity mode decay to the noise level.

Thus, the present work provides inter alia a class of room-temperature cavity resonator that exhibits quantum oscillations in the strong-coupling regime, which could be used as a "qubit" in quantum information processing. Key characteristics include:

A microwave cavity exhibiting a resonance of sufficiently high quality factor (Q) and low mode volume (physical size) that enables the strong-coupling regime to be reached—i.e. the cavity mode decay rate is less than the ensemble spin-photon coupling rate. As discussed below, means of cavity miniaturisation can be through high permittivity dielectrics (e.g. comprising strontium titanate) or loop-gap type resonators.

A gain medium comprising a material with an electronic spin multiplicity (i.e. at least a triplet state system) capable of supporting a two-level (spin) system (for example but not limited to pentacene, diamond NV-centres or silicon carbide vacancy defects). These states should be sufficient in number in order to enhance the coupling between the spin and cavity resonances so that it exceeds the cavity mode and spin mode decay rates.

The triplet system of the gain medium may be spin-polarized through pulsed optical pumping by laser or similar with short (nanosecond) duration pulses in order to create a spin-polarized population of triplet state electrons which underwent intersystem crossing from the excited singlet states on a picosecond timescale.

Alternatively, as mentioned above, the triplet system of the gain medium may be spin polarized through sustained optical pumping for a short while, i.e. as a burst of energy. This would require relatively low instantaneous optical power for approximately one millisecond. This approach would ideally suit a material with decent thermal properties such as NV-centre diamond or defective silicon carbide.

EXAMPLES

As mentioned above, a working room-temperature device has been demonstrated and its performance characterised. In more detail, this device is based on a strontium titanate (STO) dielectric resonator containing a single crystal of p-terphenyl highly doped with pentacene. The resonant frequency of the cavity matches the X-Z transition of the pentacene at 1.45 GHz and has a quality factor (Q) of around 10,000. The spin decoherence time of the pentacene is approximately 10 μs, which is roughly the same as the cavity mode lifetime (~7 μs). The pentacene-doped medium was excited by a ~4 ns optical pulse (600 nm) and produced a Rabi oscillation frequency of ~2 MHz and period of about 0.5 μs. This corresponds to a spin-photon coupling rate of 1 MHz. The Rabi oscillation frequency is due to the spin-ensemble and cavity mode populations 'splitting'. A number of oscillations (at least 10) in the cavity mode population were observed (see FIG. 2) during the lifetime of the phenomenon.

As discussed below, further examples based upon split-ring, loop-gap or LC resonators can also be realised, but it should be noted that since the ensemble spin-photon coupling is proportional to $\sqrt{N/V_m}$, it is essentially proportional to the square root of the density of spins within the medium. So, reducing the resonator mode volume will also reduce the number of spins and so the ensemble coupling rate will remain the same. Smaller resonators made from metal tend to have much lower Q factors and therefore lower cavity mode lifetimes. In order to achieve strong coupling in these examples, a sample with higher spin density will be required. This has the disadvantage of possibly higher spin decoherence rates.

In light of this density dependence of the ensemble spin-photon coupling, it is expected that higher Q dielectric resonator cavities might offer an advantage in terms of cavity mode lifetime but will need higher optical pump excitation energies in order to excite all the spins.

The following table (from [3]) provides Q values for various alternative single crystal dielectric materials from which the resonant element 18 may potentially be formed. The table also includes values of relative permittivity ($\varepsilon_r$), magnetic mode volume ($V_m$) and single spin-photon coupling ($g_s$) in respect of a resonant frequency of 1.45 GHz.

| Dielectric | $\varepsilon_r$ | Q | $V_m$ (cm$^3$) | Single spin-photon coupling $g_s$ (Hz) |
|---|---|---|---|---|
| Al$_2$O$_3$ | 9 | 180,000 | 50.0 | 0.003 |
| TiO$_2$ | 85 | 37,000 | 1.3 | 0.020 |
| KTaO$_3$ | 241 | 12,500 | 0.3 | 0.040 |
| SrTiO$_3$ | 318 | 10,000 | 0.2 | 0.050 |

The ensemble spin-photon coupling rate is given by $g_e = \gamma \sqrt{\mu_0 \hbar \omega_c N / 2 V_m}$, where $\gamma$ is the electron gyromagnetic ratio, $\mu_0$ is the vacuum magnetic permeability, $\omega_c/2\pi$ is the resonant frequency, $V_m$ is the magnetic mode volume of the cavity mode and N is the number of spins.

The following table gives values for the ensemble spin-photon coupling $g_e$ for various numbers of spins N.

| Dielectric | Single $g_s$ (Hz) | Ensemble $g_e$ (kHz) (N = 10$^{10}$) | Ensemble $g_e$ (kHz) (N = 10$^{12}$) | Ensemble $g_e$ (kHz) (N = 10$^{14}$) | Ensemble $g_e$ (MHz) (N = 10$^{16}$) |
|---|---|---|---|---|---|
| Al$_2$O$_3$ | 0.003 | 0.3 | 3 | 30 | 0.3 |
| TiO$_2$ | 0.020 | 2.0 | 20 | 200 | 2 |
| KTaO$_3$ | 0.040 | 4.0 | 40 | 400 | 4 |
| SrTiO$_3$ | 0.050 | 5.0 | 50 | 500 | 5 |

Since the mode volume will be directly proportional to the sample volume (i.e. $V_m \propto V_S$) the ensemble spin-photon coupling rate is essentially proportional to the density of spins in the sample—i.e. $g_e \propto \sqrt{N/V} \propto \rho$, where $\rho$ is the density of spin species (chromophores such as pentacene or defects such as NV$^-$ nitrogen vacancy centres in diamond).

NV$^-$ centres have concentrations in the region 0.1-10 ppm, defects in SiC even less. Pentacene concentrations are in the region of 0.1-1%, which are 4 orders of magnitude higher, which will result in ensemble spin-photon coupling rates two orders of magnitude higher than in NV$^-$ centres.

The penetration depth of nanosecond duration light pulses into a sample is linearly dependent on the concentration of absorbers. This should be borne in mind when working with larger samples (mode volumes). For example, 10 mJ 4 ns light pulses only penetrate ~2 mm into 0.1% pentacene-doped p-terphenyl crystals.

The energy in the light pulses where we observed ensemble spin-photon coupling (i.e. using a STO resonator containing a single crystal of p-terphenyl doped with pentacene) was in the region of 10 mJ. If higher Q resonators such as Al$_2$O$_3$ (sapphire) or Bragg resonators are used, then two potential problems may be encountered: (1) higher pulse energies, and (2) the limited penetration depth of short pulses which increases with pulse energy. Basically, a higher Q cavity with larger mode volume would require much larger laser energy pulses.

Accordingly, in the present work, STO is preferred as the material from which the resonant element 18 is made, as its Q factor is sufficiently high, but not so high as to cause the potential problems mentioned above. However, other materials may be used instead of STO, as long as the potential problems above are borne in mind and duly compensated for.

Possible Modifications and Alternatives

Detailed embodiments and some possible alternatives have been described above. As those skilled in the art will appreciate, a number of modifications and further alternatives can be made to the above embodiments whilst still benefiting from the inventions embodied therein. It will therefore be understood that the invention is not limited to the described embodiments and encompasses modifications apparent to those skilled in the art lying within the scope of the appended claims.

For example, in the embodiments described above, the resonator structure 14 comprises a resonant element 18 (e.g. strontium titanate) surrounding a gain medium 16 (e.g. a crystal of p-terphenyl doped with pentacene).

However, by modifying the configuration of the resonator structure 14 and/or the materials used in its construction, it is possible to increase the spin-photon coupling rate (i.e. reduce the mode volume) and thus reduce the optical pumping power required.

For example, the spin-photon coupling rate of the resonator structure 14 may be increased using any of the techniques described in WO 2013/175235 A1, individually or in combination.

Thus, one way of increasing the spin-photon coupling rate of the resonator structure 14 is by modifying the resonator structure so as to include a resonant element 18 comprising an electrically inductive metallic loop structure having one or more half-turns, and an electrically capacitive structure such as a gap or slot, or two or more parallel plates.

Examples of such resonant elements are illustrated in FIG. 4. In the literature these resonators are known as loop-gap or split-ring resonators. The one or more half-turns of metal provide an inductance L, and the gap, slot or parallel plates provide a capacitance C, both of which allow the structure to resonate at a particular frequency, usually roughly given by $(LC)^{-1/2}$.

FIG. 4 shows a number of examples of split-ring, hairpin and LC resonant elements. More particularly, FIGS. 4a and 4b are examples of circular split-ring structures, FIGS. 4c and 4d are examples of hairpin structures, and FIG. 4e is an example of a rectangular split-ring structure. In each of FIGS. 4a to 4e, the inductive loop structure is formed as a metallic layer 30, and the capacitive structure is provided by the gap or slot 32 in the loop. FIG. 4f is an example of an LC resonator in which the inductive loop structure is a metallic ring 34 and the capacitive structure is a pair of parallel plates 36, 37. The plates 36, 37 may be separated by a dielectric layer 38. More than two parallel plates may be used to form the capacitive structure. For example, an interdigitated arrangement of plates or layers may be used.

The capacitance of the resonant element can be increased through the use of a high permittivity dielectric.

The electrically inductive metallic loop structure may be formed of any suitable material (for example, gold, silver or copper) and may be deposited on, or otherwise disposed on, a substrate. The substrate may comprise, but is not limited to, alumina, titanium dioxide or strontium titanate, in single crystal or polycrystalline ceramic form. The substrate could alternatively comprise a polymer or polymer composite material, or a metal or metallodielectric structure, or could be made from conventional printed circuit board or FR4 (glass-reinforced epoxy laminate) printed circuit board material.

Figure 4A:
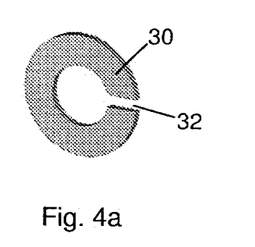
FIG. 4 illustrates schematic examples of split-ring, hairpin and LC resonant elements, as may be used to increase the spin-photon coupling rate of the resonator structure.
Figure 4B:
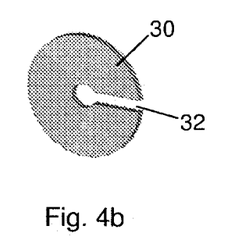
Figure 4C:
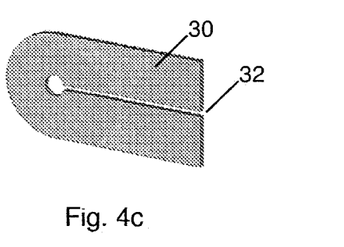
Figure 4D:
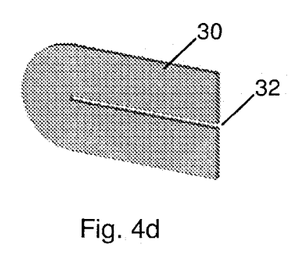
Figure 4E:
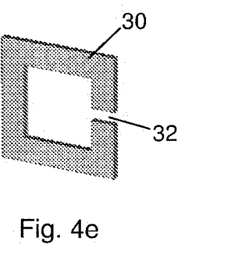
Figure 4F:
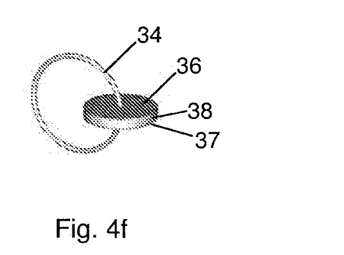
Figure 5A:
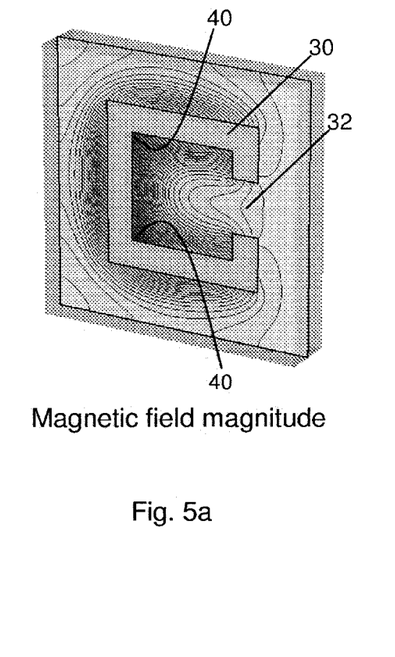
FIG. 5 illustrates the absolute magnitude of magnetic and electric field energy distribution for a rectangular split-ring resonant element.
Figure 5B:
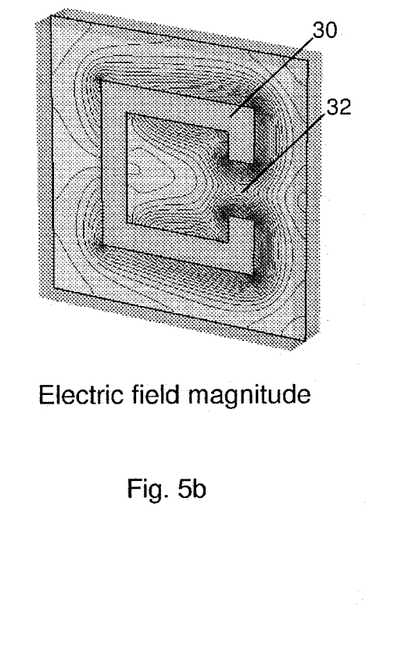

FIG. 5 illustrates the absolute magnitude of magnetic and electric field energy distribution for a rectangular split-ring resonant element 30 of the form shown in FIG. 4e. FIG. 5a shows the magnetic field energy density of the split-ring resonant element, and FIG. 5b shows the corresponding electric field energy density. From FIG. 5a it can be seen that there is a high magnetic field energy density in the innermost internal corners 40 of the split-ring 30. On the other hand, from FIG. 5b it can be seen that the electric field energy density is low in the corners of the split-ring 30, and instead is located around the gap 32. Thus, with a resonant element of the form shown in FIGS. 4e and 5, the gain medium 16 would preferably be situated in the regions of relatively high magnetic field density within the resonant element—i.e. at the innermost internal corners 40 of the split-ring 30.

Figure 6:
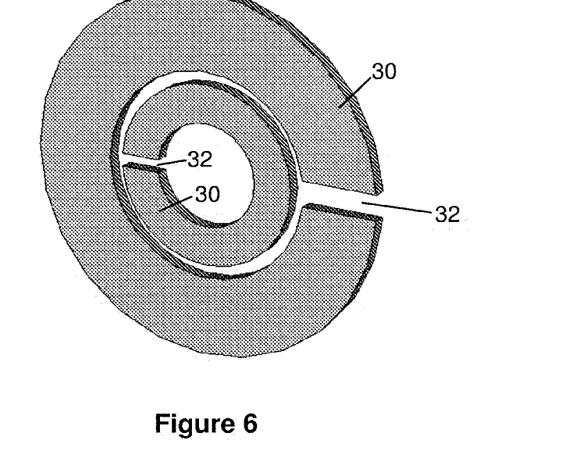
FIG. 6 illustrates a schematic example of a dual split-ring resonant element.

FIG. 6 shows a further example of a resonant element 18—more particularly, a dual split-ring resonant element. This comprises two concentric inductive loop structures formed as metallic layers 30a, 30b, each having a respective capacitive slot or gap 32a, 32b situated on opposite sides. An advantage of this structure is that it gives a reduction in the resonant frequency due to additional inductance provided by the second split-ring and the capacitance between the rings. Also, the magnetic field density within this type of resonant element is more symmetrically distributed.

The resonator apparatus 10 may be provided with temperature stabilisation means, for example but not limited to a Peltier element, a Stirling cycle cooler, a pulse tube cooler, or a Gifford-McMahon cooler. Thermal management means, for example but not limited to a supply of forced gas or forced air, may also be provided.

Finally, the transition frequency of the triplet state of the gain medium 16 may be tuned by the application of a magnetic field to the gain medium. The magnetic field may be provided by a permanent magnet such as ferrite or neodymium iron boron, or by passing an electric current through a coil in close proximity to the gain medium 16.

APPENDIX

The Experimental Events which Surprisingly LED Us to the Generation and Observation of Coherent Spin-Photon Oscillations We were conducting experiments to probe the spin dynamics of pentacene in a room-temperature (strontium titanate based) maser using a short nanosecond duration pulsed optical parametric oscillator (OPO) with a tuneable wavelength of ~590 nm. The power of the resulting single maser output burst was measured by inserting a small antenna into the maser cavity, to couple microwaves to the measurement equipment. The coupled power was fed into a low-noise amplifier and then into a crystal detector. The crystal detector rectified the microwave signal producing a voltage, which was detected by an oscilloscope.

During the course of these experiments we came into possession of a gain medium with a pentacene concentration an order of magnitude higher relative to previous samples, in this case at 0.1% mol/mol. We tested this sample and noticed that it gave a much stronger maser output burst but also had a very weak (barely noticeable) amplitude secondary maser burst following shortly after the first one. After carefully tuning the wavelength of optical excitation and adjusting the maser cavity coupling, this secondary peak became more pronounced. We wondered what was causing the secondary peak and one idea was that the increased maser output power was saturating the amplifier and causing a transient effect, an echo. So we removed the amplifier altogether and repeated the experiments. The secondary maser burst persisted, but there was also a trace of a third maser burst. We then wondered if the crystal detector was responsible, so we tested its response, by varying the amount of microwave input power and measuring its output voltage. It was then that we realised that the detector was only sensitive to microwave powers in the −20 to −10 dBm range and that lower microwave powers gave very small detector voltages, i.e. were undetectable. This was due to the non-linear response of the detector.

Since our digital storage oscilloscope was capable of sampling signals at 20 Gs$^{-1}$ and had a bandwidth close to the frequency of the maser output signal (1.45 GHz), we decided to see if we could, using only an oscilloscope, directly detect the microwave power coming out of the maser. We were successful in this line of enquiry and observed many (up to 5 or 6) maser bursts following the primary burst. Fourier analysis of the microwave signal emerging from the maser revealed that the signal consisted of two distinct frequencies separated by a few MHz and frequency filtering of the response removed unwanted noise from the signal. This filtering revealed 10-15 clear oscillations in the microwave output power, demonstrating that, unexpectedly, spin-photon coupling had been achieved.

This was, as far as we know, the world's first observation of strong-coupling in a room-temperature solid-state spin-ensemble. Given that we started out to investigate masing (in which a main objective is to amplify signals), it was entirely unexpected that our work resulted in the generation of collective spin states having potential application in quantum information processing devices.

As discussed above, a number of factors came together to make our observation of quantum oscillations possible. We may summarise the steps that led to this observation as follows:

(1) Significant miniaturisation of the maser cavity, in this case by the use of strontium titanate dielectric material, increased the spin-photon coupling by a factor of 16.
(2) Increased concentration of pentacene in the gain medium.
(3) The use of a nanosecond pulsed laser (an inherently counterintuitive step when investigating masing, as conventionally a key objective is to extend the duration of the maser signal, e.g. by using a quasi-continuous light source).
(4) That under the above circumstances the light pulse penetrated only 2 mm into the pentacene sample, which, as a consequence of the miniaturisation, was only slightly less than the diameter of the gain medium.
(5) That although the maser cavity had been miniaturised significantly, its Q factor was still high.

REFERENCES

[1] Kurizki, G. et al. "Quantum technologies with hybrid systems." Proceedings of the National Academy of Sciences 112.13 (2015): 3866-3873.
[2] Reithmaier, J. P., et al. "Strong coupling in a single quantum dot-semiconductor microcavity system." Nature 432.7014 (2004): 197-200.
[3] Breeze, J. et al. "Enhanced magnetic Purcell effect in room-temperature masers." Nature Comms. 6 (2015).
[4] Oxborrow, Breeze & Alford. "Room-temperature solid-state maser." Nature 488, 353-356 (2012).

The invention claimed is:

1. Apparatus for establishing quantum oscillations, specifically Rabi oscillations, at room temperature, the apparatus comprising:
a cavity having a resonator structure therein, the resonator structure comprising a resonant element and a gain medium, a species of the gain medium having an electronic spin multiplicity capable of supporting a two-level spin system; and
an optical pump arranged to pump the resonator structure and thereby generate microwave output power through stimulated emission of microwave photons;
wherein said species of the gain medium is of a sufficiently high concentration such as to have an ensemble spin-photon coupling rate which exceeds both the cavity mode decay rate and the spin-spin decoherence rate; and
wherein the optical pump is configured to pump the resonator structure using a short pulse of nanosecond duration, or sustained optical pumping of a millisecond in duration, to excite said species of the gain medium into a spin-polarized two-level system that exhibits the Rabi oscillations in the microwave output power.

2. The apparatus according to claim 1, wherein the optical pump comprises one of:
a pulsed laser;
a laser diode;
a light emitting diode; and
a flash lamp.

3. The apparatus according to claim 1, wherein the gain medium comprises a polyaromatic hydrocarbon.

4. The apparatus according to claim 1, wherein the concentration of said species of the gain medium is of the order of 0.1% or greater.

5. The apparatus according to claim 1, wherein the gain medium comprises one of:
diamond with nitrogen vacancy centres, such that said species comprises nitrogen vacancy centres; and
silicon carbide with vacancy defects, such that said species comprises vacancy defects.

6. The apparatus according to claim 1, wherein the gain medium is a single crystal.

7. The apparatus according to claim 1, wherein the resonant element has a quality factor of the order of 10,000 or greater.

8. The apparatus according to claim 1, wherein the resonant element has a magnetic mode volume of 50 cm$^3$ or less, in respect of a resonant frequency of the order of 1.45 GHz.

9. The apparatus according to claim 1, wherein the gain medium is disposed within the resonant element.

10. The apparatus according to claim 1, wherein the resonant element comprises one of:
strontium titanate;
titanium dioxide;
potassium tantalate; and
alumina.

11. The apparatus according to claim 1, wherein the resonant element comprises an electrically inductive metallic loop structure having one or more half-turns, and an electrically, capacitive structure.

12. A method of establishing quantum oscillations, specifically Rabi oscillations at room temperature, the method comprising:

providing a cavity having a resonator structure therein, the resonator structure comprising a resonant element and a gain medium, a species of the gain medium having an electronic spin multiplicity capable of supporting a two-level spin system; and optical pumping the resonator structure and thereby generating microwave output power through stimulated emission of microwave photons;

wherein said species of the gain medium is of a sufficiently high concentration such as to have an ensemble spin-photon coupling rate which exceeds both the cavity mode decay rate and the spin-spin decoherence rate; and wherein the optical pumping pumps the resonator structure using a short pulse of nanosecond duration, or sustained optical pumping of a millisecond in duration, to excite said species of the gain medium into a spin-polarized two-level system that exhibits the Rabi oscillations in the microwave output power.

13. The method according to claim 12, wherein the optical pumping is performed using one of:
a pulsed laser;
a laser diode;
a light emitting diode; and
a flash lamp.

14. The method according to claim 12, wherein the gain medium comprises a polyaromatic hydrocarbon.

15. The method according to claim 12, wherein the gain medium comprises one of:
diamond with nitrogen vacancy centres, such that said species comprises nitrogen vacancy centre; and
silicon carbide with vacancy defects, such that said species comprises vacancy defects.

16. The method according to claim 12, wherein the resonant element has a magnetic mode volume of 50 $cm^3$ or less, in respect of a resonant frequency of the order of 1.45 GHz.

17. The method according to claim 12, wherein said species of the gain medium has a spin-photon coupling rate of the order of 1 MHz or above.

18. The method according to claim 12, further comprising supplying input radiation to manipulate the spin system of the gain medium.

19. The method according to claim 12, wherein the exhibited Rabi oscillations have a Rabi oscillation frequency of the order of 1-2 MHz.

20. The method according to claim 12, wherein the exhibited Rabi oscillations are at least 10 in number.

* * * * *